(12) United States Patent
Vollert et al.

(10) Patent No.: US 8,631,694 B2
(45) Date of Patent: Jan. 21, 2014

(54) CONNECTING ELEMENT FOR MEASURING AN ACTUATING FORCE OF A VEHICLE BRAKE SYSTEM

(75) Inventors: Herbert Vollert, Vaihingen/Enz (DE); Armin Verhagen, Schwieberdingen (DE); Jochen Mayer, Stuttgart-Botnang (DE)

(73) Assignee: Robert Bosch GmbH, Stuttgart (DE)

( * ) Notice: Subject to any disclaimer, the term of this patent is extended or adjusted under 35 U.S.C. 154(b) by 189 days.

(21) Appl. No.: 13/059,818

(22) PCT Filed: Jun. 19, 2009

(86) PCT No.: PCT/EP2009/057657
§ 371 (c)(1),
(2), (4) Date: Feb. 18, 2011

(87) PCT Pub. No.: WO2010/020449
PCT Pub. Date: Feb. 25, 2010

(65) Prior Publication Data
US 2011/0146395 A1    Jun. 23, 2011

(30) Foreign Application Priority Data
Aug. 19, 2008  (DE) .......................... 10 2008 041 349

(51) Int. Cl.
    *G01L 5/28*    (2006.01)
(52) U.S. Cl.
    USPC ............................................. 73/132; 73/121
(58) Field of Classification Search
    USPC ......................................... 78/132; 303/114.1
    See application file for complete search history.

(56) References Cited

U.S. PATENT DOCUMENTS

| 4,278,009 | A  | * | 7/1981  | Demido ............................ 91/47 |
| 4,535,171 | A  |   | 8/1985  | Rokach |
| 6,347,518 | B1 | * | 2/2002  | Kingston et al. ................ 60/552 |
| 6,367,886 | B1 |   | 4/2002  | Shaw |
| 6,840,586 | B2 | * | 1/2005  | Kusano et al. ............. 303/114.1 |
| 7,127,891 | B2 | * | 10/2006 | Ohlig et al. .................. 60/547.1 |
| 2001/0043009 | A1 |   | 11/2001 | Anderson et al. |
| 2002/0117893 | A1 |   | 8/2002  | Shaw et al. |
| 2003/0205931 | A1 | * | 11/2003 | Muller et al. .................... 303/20 |
| 2007/0001508 | A1 | * | 1/2007  | Schluter ..................... 303/114.3 |

FOREIGN PATENT DOCUMENTS

| DE | 4324041 A1 | 1/1995 |
| DE | 19838568 C1 | 2/2000 |
| EP | 0708006 A1 | 4/1996 |
| EP | 0768224 A1 | 4/1997 |
| EP | 768224 A1 * | 4/1997 |
| EP | 0771705 A1 | 5/1997 |
| FR | 2838695 A1 | 10/2003 |
| JP | 2004-161074 A | 6/2004 |
| WO | WO 9929548 A1 * | 6/1999 |

* cited by examiner

*Primary Examiner* — Leonard Chang
*Assistant Examiner* — Irving A Campbell
(74) *Attorney, Agent, or Firm* — Maginot, Moore & Beck

(57) ABSTRACT

A connecting element connects a brake pedal to a brake force amplifier of a vehicle brake system. A helical compression spring as a first spring element and a rubbery-elastic reaction disk as a second spring element are disposed between a pedal rod and a piston rod of the connecting element, the spring elements being installed in series due to the arrangement thereof. Due to the higher spring rate of the reaction disk preferably increasing with load, the connecting element has a progressive spring characteristic line. As soon as the pedal rod contacts the reaction disk the helical compression spring and the reaction disk act in parallel and serially such that the progression of the total spring characteristic line further increases.

12 Claims, 1 Drawing Sheet

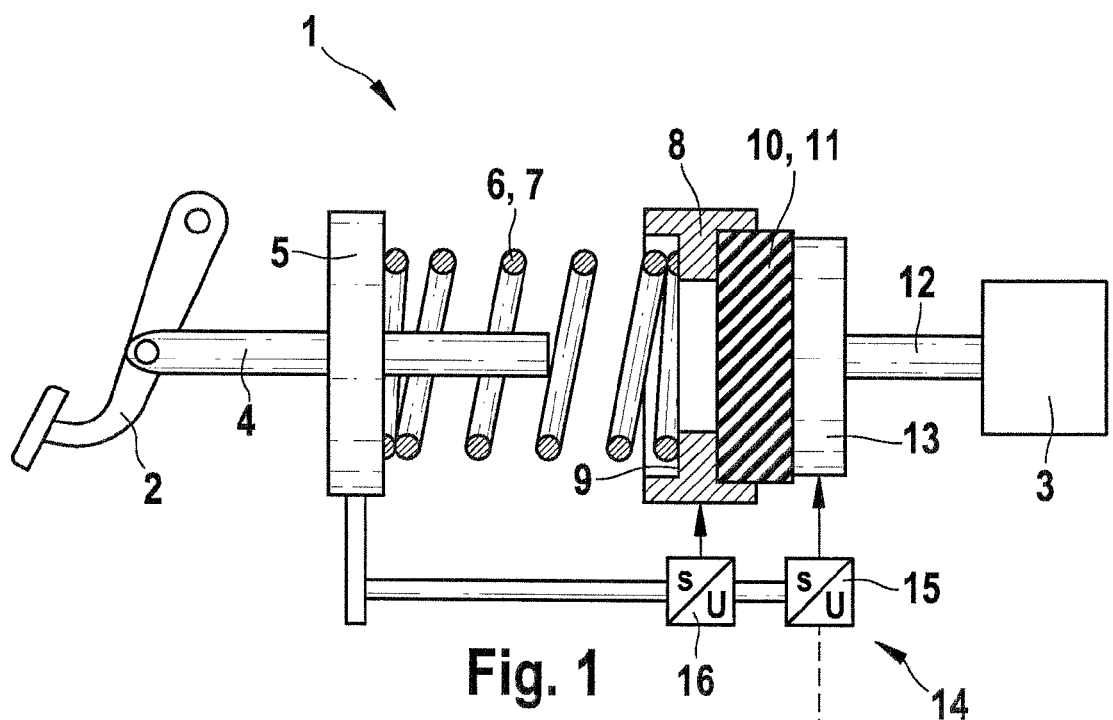
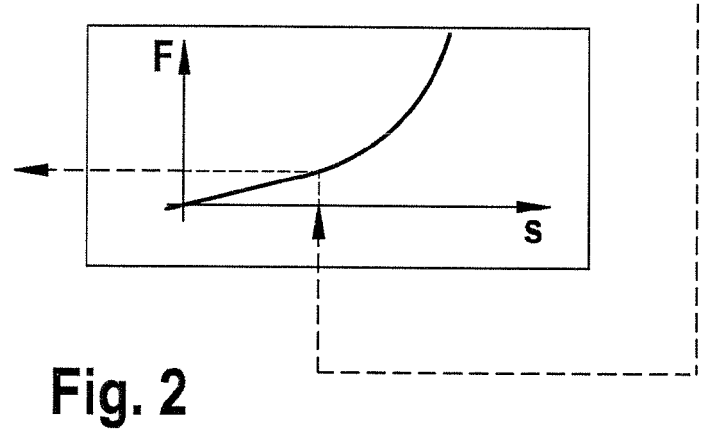

CONNECTING ELEMENT FOR MEASURING AN ACTUATING FORCE OF A VEHICLE BRAKE SYSTEM

CROSS-REFERENCE TO RELATED APPLICATION

This application is a 35 USC 371 application of PCT/EP 2009/057657 filed on Jun. 19, 2009.

BACKGROUND OF THE INVENTION

1. Field of the Invention

The invention relates to a connecting element for measuring an actuating force of a vehicle brake system.

2. Description of the Prior Art

Hydraulic vehicle brake systems have a connecting element which is typically called a pedal rod or piston rod, and which connects a user control element of the vehicle brake system with an input element of the vehicle brake system. The user control element is the element or component at which an actuating force is introduced into the vehicle brake system. In conventional vehicle brake systems, it is a (foot) brake pedal or, especially in motor cycles, a (hand) brake lever. The input element of conventional hydraulic vehicle brake systems is the so-called primary piston or rod piston of the master cylinder, which is connected to the brake pedal or brake lever by the connecting element, namely the pedal rod or piston rod. The connecting element transmits the actuating force, that is, the muscle power exerted on the brake pedal or the brake lever, to the input element, or in other words to the primary piston or rod piston of the master cylinder. However, the invention is not limited to the so-called pedal rod or piston rod as a connecting element; instead, it is directed in general to a connecting element which transmits the actuating force.

In many publications, measuring the actuating force of a vehicle brake system is claimed; typically, this involves a force sensor or the like, without explaining the structure and mode of operation thereof. For instance, published German patent application DE 103 27 553 A1, whose subject is an electromechanical brake booster, discloses a force sensor that is disposed in a piston rod.

Published German patent application DE 199 36 433 A1 is comparable, whose subject is an electromagnetic brake booster and which has a force-tension converter that is disposed between a pedal and a piston rod, the piston rod being disposed in the extension of the pedal rod.

The subject of published German patent application DE 103 18 850 A1 is a vehicle brake system with hydraulic brake boosting. It has a master cylinder, whose primary piston or rod piston, on its back side toward a brake pedal, can be hydraulically subjected to pressure from an external energy source. The master cylinder has a pedal travel simulator, which includes a simulator spring. The pedal travel simulator, in a way that is as close to reality as possible, simulates a pedal force/travel characteristic of the kind that conventional hydraulic vehicle brake systems with or without brake boosting have, so that a driver has the pedal feel he is used to. The master cylinder of the known vehicle brake system accordingly does not have a rigid piston rod but rather a pedal rod or piston rod that shortens spring-elastically upon subjection to force, because of the simulator spring. Measuring the actuating force is not disclosed; instead, what is measured is a travel of the pedal rod or piston rod, or in the final analysis a pedal travel.

Published German patent application DE 100 57 557 A1 discloses an electromechanical brake booster, in which a force sensor is disposed between a pedal rod and a piston rod disposed in the extension of the pedal rod. A reaction disk is also disposed between the pedal rod and the piston rod, for the sake of comfortable actuation. As a result of its disposition, the reaction disk is disposed in series with the force sensor.

SUMMARY OF THE INVENTION

The connecting element of the invention for measuring an actuating force of a vehicle brake system, has a spring elasticity with a progressive characteristic spring curve as well as a deformation measuring device for measuring deformation of the connecting element because of an actuating force exerted on the connecting element. The connecting element itself can be spring-elastic, or it has one or more spring elements. If an actuating force is exerted on the connecting element of the invention, the connecting element deforms spring-elastically and in particular becomes shorter. With the deformation measuring device, the deformation, such as the shortening, of the connecting element is measured. It is a standard for the actuating force; because of the progressive characteristic spring curve of the connecting element, there is no linear dependency between the deformation of the connecting element and the actuating force acting on the connecting element.

The term progressive characteristic spring curve means that a spring rate of the connecting element becomes greater with increasing deformation of the connecting element. The spring rate is also called spring stiffness; at a constant spring rate (which does not exist here!), the term spring constant is also usual. With a low actuating force, the spring rate is accordingly lower than with a high actuating force. The characteristic spring curve of the connecting element of the invention can be either continuous or discontinuous. In the latter case, the characteristic spring curve can be composed of linear regions, with a characteristic spring curve that becomes steeper from one region to another and which regions merge with one another at kink points. A graduated increase in the characteristic spring curve is also conceivable. In the case of a discontinuous course, the characteristic spring curve has at least two regions with different spring rates. A constant spring rate means a rectilinear characteristic spring curve with a constant slope; the slope of the characteristic spring curve is the spring rate, namely the change in force in proportion to the deformation or the spring travel.

Because of the progressive characteristic spring curve, upon a change of force and at a low actuating force, the deformation of the spring-elastic connecting element of the invention is relatively major. As a result, the resolution of the measurement signal, that is, the signal quality of the deformation measurement, is increased. This is an advantage for brake force regulation, because on the one hand, when the actuating force is low, a change in force is normally also slight, and because braking events in city traffic are for the most part effected with a low to medium actuating force.

If the actuating force is high, the connecting element of the invention, because of its progressive characteristic spring curve, is stiffer; the deformation upon a change of force becomes less. As a result, an actuation travel by which a brake pedal or brake lever has to be moved farther, becomes shorter at a high actuating force.

Because of the low spring rate, at a low actuating force, of the connecting element of the invention, feedback effects on a brake pedal or a brake lever are lessened, because of inertias of a brake booster.

Further characteristics of the invention will become apparent from the ensuing description of one embodiment in conjunction with the claims and the drawings. In embodiments of the invention, the individual characteristics can each be implemented on their own, or a plurality of them can be implemented.

BRIEF DESCRIPTION OF THE DRAWINGS

The invention will be described below in terms of an embodiment in the drawings. In the drawings:

FIG. 1 is a schematic illustration of a connecting element of the invention; and FIG. 2 shows a characteristic spring curve of the connecting element of FIG. 1.

DESCRIPTION OF THE PREFERRED EMBODIMENT

The connecting element 1 of the invention, shown in FIG. 1, connects a brake pedal 2 or other user control element to an input of a brake booster 3 or some other input element of a vehicle brake system not otherwise shown. The input element may for instance also be the primary piston or rod piston, not shown here, of a master cylinder. The connecting element 1 has a pedal rod 4, which is connected in articulated fashion to the brake pedal 2. The pedal rod 4 has a plate 5 approximately in its longitudinal center, which is connected rigidly, for instance in one piece, with the pedal rod 4. The connecting element 1 transmits an actuating force from the brake pedal 2 to the brake booster 3.

A first spring element 6, which is braced on the plate 5, is disposed coaxially to the pedal rod 4. In the embodiment of the invention shown and described, the first spring element 6 is embodied as a helical compression spring 7, one end winding of which is seated on the plate 5 of the pedal rod 4.

Another end winding of the helical compression spring 7 is seated on a perforated disk 8, which can also in general be called an adapter piece. The perforated disk 8 has cylindrical countersunk features 9 on both face ends, and the helical compression spring 7 is seated on the bottom of the countersunk feature, facing toward it, of the perforated disk 8. The perforated disk 8 is likewise disposed coaxially to the helical compression spring 7, forming the first spring element 6, and to the pedal rod 4.

A reaction disk 10 is disposed in the countersunk feature of the perforated disk 8 facing away from the helical compression spring 7. The reaction disk 10 is a rubber-elastic second spring element 11, and it has a higher spring rate than the helical compression spring 7 that forms the first spring element 6; that is, the reaction disk 10 is harder than the helical compression spring 7. It protrudes from the countersunk feature of the perforated disk 8. Preferably, the reaction disk 10, which forms the second spring element 11, is considerably harder and thus has a substantially higher spring rate than the helical compression spring 7 that forms the first spring element 6. The reaction disk 10, which comprises rubber or an elastic plastic, has a constant spring rate, but its spring rate increases with increasing stress and deformation. The spring rate of the reaction disk 10 can rise linearly, progressively, or degressively; its characteristic spring curve, that is, the derivation of the force after the deformation, is a rising curve. The deformation of the reaction disk 10 can also be understood as its spring travel. The reaction disk 10 is likewise disposed coaxially to the perforated disk 8, to the helical compression spring 7, and to the pedal rod 4.

On a face end of the reaction disk 10 facing away from the pedal rod 4 and the helical compression spring 7, a piston rod 12 is disposed, which has a plate 13, rigidly connected to it, for instance in one piece, on its end toward the reaction disk 10, with which plate the piston rod 12 is seated on the reaction disk 10. The piston rod 12 is connected to the input of the brake booster 3. The piston rod 12 is likewise disposed coaxially to the parts of the connecting element 1, that is, to the reaction disk 10, the perforated disk 8, the helical compression spring 7, and the pedal rod 4.

The connecting element 1 has a deformation measuring device 14, which includes a travel sensor 15, which is connected to the plate 5 of the pedal rod 4 and measures the spacing of the plate 5 of the pedal rod 4 from the plate 13 of the piston rod 12. Thus with the deformation measuring device 14, a deformation or in other words a change in length of the connecting element 1 can be measured. The measurement is done at two points spaced far apart from one another, namely at the plates 5, 13 of the pedal rod 4 and piston rod 12. The measurement accordingly takes place near the ends of the connecting element 1 and over its entire spring elasticity that is effected by the two spring elements 6, 11, namely by the helical compression spring 7 and the reaction disk 10. Because of the great measurement length over the entire spring elasticity, a major deformation or in other words change in length is measured; as a result, the deformation measuring device has high resolution and high signal quality. The pedal rod 4 and the piston rod 12 can be considered to be rigid relative to the spring elements 6, 11, so that a spacing measurement at even farther-apart points of the connecting element 1 does not increase the resolution and signal quality of the measurement. Alternatively, the deformation measurement can also take place over only the softer, first spring element 6, without the considerably stiffer reaction disk 10, using a travel sensor 16. This worsens the signal quality only negligibly slightly, because the majority of the deformation occurs at the softer spring element 6.

Upon brake actuation by depression of the brake pedal 2, a muscle power exerted on the brake pedal 2 is transmitted as an actuating force from the brake pedal 2 to the brake booster 3 via the connecting element 1. In the process, the connecting element 1 shortens, because of its spring elasticity that is due to the two spring elements 6, 11. If the actuating force is low, the reaction disk 10, which forms the second spring element 11, can be considered virtually rigid, because of its high spring rate; accordingly, when the actuating force is low, essentially only the helical compression spring 7, which forms the first spring element 6, is deformed. A characteristic spring curve of the connecting element 1, which is shown in FIG. 2, is therefore virtually a straight line when the actuating force is low; at a low actuating force, a total spring rate of the connecting element 1 is virtually constant.

If the actuating force becomes greater, the reaction disk 10 also begins to deform elastically. Since the reaction disk 10 and the helical compression spring 7, which form the spring elements 6, 11 of the connecting element 1, are connected in series, the total spring rate of the connecting element 1 increases when the reaction disk 10 is deformed with increasing actuating force; because of the different spring rates of its spring elements 6, 11 and their serial connection, the connecting element 1 has a progressive characteristic spring curve. If the reaction disk 10 itself has a progressive characteristic spring curve, then the progression of the total characteristic spring curve of the connecting element 1 increases.

If the actuating force that is exerted on the connecting element 1 via the brake pedal 2 increases further, the pedal rod 4, which protrudes past the plate 5, on which the helical compression spring 7 is braced, in the direction of the reaction disk, strikes the reaction disk 10. From this level of the actuating force onward, the helical compression spring 7, which forms the first spring element 6 of the connecting element 1, is acted upon by the plate 5 of the pedal rod 4, and at the same time the reaction disk 10, which forms the second spring element 11 of the connecting element 1, is acted upon by the pedal rod 4. The reaction disk 10 is acted upon directly by the pedal rod 4 (rather than only indirectly via the helical compression spring 7); the two spring elements 7, 11 are thus acted upon in parallel and they act in parallel (and in series). As a result of this parallel connection of the two spring elements 6, 11 beyond a defined level of the actuating force, the total spring rate of the connecting element 1 increases further. The progression of the total characteristic spring curve of the connecting element 1, which is shown in FIG. 2, increases further. The spring rate of the reaction disk 10 changes, if it is acted upon by the pedal rod 4 over a circular area in its middle or by the perforated disk 8 on a circular-annular area on its edge; as a result, the spring rate of the reaction disk 10, with a high actuating force, is different from when the actuating force is low to medium, if the pedal rod 4 is not yet braced on the reaction disk 10.

From the measurement of the spacing of the two plates 5, 13 of the pedal rod 4 and of the piston rod 12, or in other words from the measurement of the change in length of the connecting element 1, the actuating force, as indicated by a dashed line leading from the travel sensor 15 of FIG. 1, can be ascertained from the total characteristic spring curve of the connecting element 1, which is shown in FIG. 2. For closed-loop brake force control, however, it is not necessary that the total characteristic spring curve be known in every case; closed- or open-loop control can also be done with a change in length of the connecting element 1 as the input variable. In closed- and open-loop control technology, the input variable is also called the reference variable or set-point value. Alternatively, as noted, the measurement of the spacing of the plate 5 of the pedal rod 4 from the perforated disk 8, also called an adapter piece, can be done with the travel sensor 16. The one measurement does not preclude the redundant other measurement.

The foregoing relates to the preferred exemplary embodiment of the invention, it being understood that other variants and embodiments thereof are possible within the spirit and scope of the invention, the latter being defined by the appended claims.

The invention claimed is:

1. A connecting element for measuring an actuating force of a vehicle brake system, which connecting element connects a user control element of the vehicle brake system to an input element of the vehicle brake system and transmits an actuating force from the user control element to the input element, the connecting element comprising:
    a deformation measuring device that measures a deformation of the connecting element to determine an actuating force applied to the user control element;
    a first spring element that has a first spring rate;
    a second spring element that has a second spring rate;
    a pedal rod connected to the user control element, the pedal rod including a first plate;
    a piston rod connected to the input device, the piston rod including a second plate; and
    an intermediate plate between the first and second plates, wherein the first spring rate is different than the second spring rate,
    wherein the first and second spring elements operate in series to urge the user control element and the input device in opposite directions,
    wherein the first spring element and the second spring element operate both in series and in parallel to urge the user control element and the input device in opposite directions when the deformation of the connecting element exceeds a predetermined value,
    wherein the deformation measuring device measures a combined deformation of the first spring element and the second spring element,
    wherein the first spring element is interposed between the first plate and the intermediate plate, and the second spring element is interposed between the intermediate plate and the second plate, and
    wherein the deformation measuring device measures the combined deformation of the first spring element and the second spring element by measuring a change in a distance between the first plate and the second plate.

2. The connecting element as defined by claim 1, wherein at least one of the first spring element and the second spring element has a non-constant spring rate.

3. The connecting element as defined by claim 1, wherein the first spring element is a helical compression spring.

4. The connecting element as defined by claim 3, wherein the second spring element is a rubber-elastic reaction disc and the second spring rate is greater than the first spring rate.

5. The connecting element as defined by claim 1, wherein the second spring element is a rubber-elastic reaction disc.

6. The connecting element as defined by claim 1, wherein the pedal rod extends through a center axis of the first spring element and engages the second spring element when the deformation of the connecting element exceeds the predetermined value to enable the second spring element to act in parallel with the first spring element through the pedal rod to urge the user control element and the input device in opposite directions.

7. The connecting element as defined by claim 1 further comprising a pedal rod operatively connected to the user control element and extending through a center axis of the first spring element such that when the deformation of the connecting element exceeds the predetermined value, the second spring element acts in parallel with the first spring element through the pedal rod to urge the user control element and the input device in opposite directions.

8. The connecting element as defined by claim 1, wherein:
    the user control element includes a brake pedal,
    the input element includes a brake booster,
    the first and second spring elements operate in series to urge the brake pedal and the brake booster in opposite directions, and
    the first spring element and the second spring element operate both in series and in parallel to urge the brake pedal and the brake booster in opposite directions when the deformation of the connecting element exceeds a predetermined value.

9. The connecting element as defined by claim 1, wherein:
    the user control element includes a brake pedal,
    the input element includes a master cylinder,
    the first and second spring elements operate in series to urge the brake pedal and the master cylinder in opposite directions, and
    the first spring element and the second spring element operate both in series and in parallel to urge the brake pedal and the master cylinder in opposite directions when the deformation of the connecting element exceeds a predetermined value.

10. A connecting element for measuring an actuating force of a vehicle brake system, which connecting element connects a user control element of the vehicle brake system to an input element of the vehicle brake system and transmits an actuating force from the user control element to the input element, the connecting element comprising:
- a deformation measuring device that measures a deformation of the connecting element to determine an actuating force applied to the user control element;
- a first spring element having a first spring rate;
- a second spring element having a second spring rate;
- a pedal rod connected to the user control element, the pedal rod including a first plate;
- a piston rod connected to the input device, the piston rod including a second plate; and
- an intermediate plate between the first and second plates,
- wherein the first and second spring elements operate in series to urge the user control element and the input device in opposite directions,
- wherein the first spring element and the second spring element operate both in series and in parallel to urge the user control element and the input device in opposite directions when the deformation of the connecting element exceeds a predetermined value,
- wherein the first spring element is interposed between the first plate and the intermediate plate, and the second spring element is interposed between the intermediate plate and the second plate, and
- wherein the deformation measuring device measures the deformation of the first spring element by measuring a change in a distance between the first plate and the intermediate plate.

11. The connecting element as defined by claim 10, wherein the first spring rate is different from the second spring rate.

12. The connecting element as defined by claim 11, wherein the first spring rate is less than the second spring rate.

* * * * *